United States Patent [19]

McShane

[11] Patent Number: 4,756,783

[45] Date of Patent: Jul. 12, 1988

[54] METHOD FOR MAKING A MULTI-PANE THERMALLY INSULATING CONSTRUCTION

[75] Inventor: John McShane, North Hollywood, Calif.

[73] Assignee: Products Research and Chemical Corp., Glendale, Calif.

[21] Appl. No.: 930,782

[22] Filed: Nov. 14, 1986

[51] Int. Cl.$^4$ ............ B32B 31/06; C03C 27/10; E06B 3/66

[52] U.S. Cl. ............ 156/104; 52/171; 52/304; 156/107; 156/109; 428/34; 428/419

[58] Field of Search ............ 156/99, 104, 107, 109; 428/34, 419; 52/171, 304, 788

[56] References Cited

U.S. PATENT DOCUMENTS

| | | | |
|---|---|---|---|
| 2,466,963 | 4/1949 | Patrick et al. | 156/327 X |
| 4,020,033 | 4/1977 | Dannels | 528/25 X |
| 4,425,389 | 1/1984 | Schöllhorn et al. | 156/107 X |
| 4,431,691 | 2/1984 | Greenlee | 428/34 |
| 4,622,249 | 11/1986 | Bowser | 428/34 |

*Primary Examiner*—Robert A. Dawson
*Attorney, Agent, or Firm*—Poms, Smith, Lande & Rose

[57] ABSTRACT

A method for substantially preventing the escape of argon gas from a chamber defined by two window panes in spaced relation and spacing means between the inner edge surface portions of the window pane by:

forming a seal at the edge portions of the spacing means of a liquid polymer composition composed of (a) from about 90 mole percent to about 25 mole percent of thioether mercaptan terminated disulfide polymer of the formula HS(RSS)$_m$R'SH;

(b) from about 10 mole percent to about 75 mole percent of diethyl formal mercaptan terminated polysulfide polymer of the formula HS(RSS)$_n$RSH; wherein in the formulae R is —C$_2$H$_4$—O—CH$_2$H$_4$—; R' is alkyl thioether of from 4 to 20 carbon atoms and the value of m and n is such that the diethyl formal mercaptan terminated polysulfide and the thioether mercaptan terminated disulfide polymer have an average molecular weight of between about 1000 and about 4000; and (c) a curing effective amount of a curing agent;

curing said liquid polymer composition to a solid elastomer which is substantially impervious to argon gas; and filling the chamber with argon gas.

10 Claims, 1 Drawing Sheet

METHOD FOR MAKING A MULTI-PANE THERMALLY INSULATING CONSTRUCTION

BACKGROUND OF THE INVENTION

The present invention relates to multi-pane thermally insulating construction particularly adopted for use in buildings and, more particularly, thermally insulating windows.

For a number of years, and particularly since the energy crisis in the early 1970's, persons in the building construction industry throughout the world have been working on improving the thermal insulating quality of windows since this is one of the areas in a building where high thermal losses occur. Therefore, the building industry in general, particularly in exceedingly hot or cold climates, has turned to double glazed, thermally insulating windows. These windows have been modified in recent years in an effort to further improve insulating efficiency and prolong the effective life of the windows.

One modification in thermally insulating windows is the development of "Low E" glass wherein the surface of the glass is treated so that infared rays are reflected while visible light can pass through. Other modifications include a transparent plastic membrane with infared reflecting properties. But probably the most important modification has been the replacement of air in the compartment formed by two spaced transparent panels, glass or plastic, with an inert gas. Among inert gases argon is the preferred gas. By using argon, significant improvements in thermal insulating properties have been achieved.

A significant problem in prolonging the life of argon gas filled thermally insulating windows is the loss of the gas through the elastomeric seals formed between the inner edge margins of the panels forming the compartment containing the argon gas. The prior art elastomeric sealants have allowed the gas to diffuse through the seal which, within two or three years, cause significant loss of the argon gas and the thermal insulating qualities of the thermally insulating windows. The present invention provides seals which surprisingly significantly reduce the loss of argon. As a matter of fact, the thermal insulating construction of the present invention utilizing the seals disclosed herein increases the life of the multi-pane thermally insulating construction two fold.

The seals of the present invention are formed by using thioether mercaptan terminated disulfide liquid polymer compositions which cure to solid elastomers and surprisingly exhibit substantially decreased permeability to argon gas in addition to having other desirable properties including high tensile strength and excellent resistance to ultraviolet light. The polymer compositions of the present invention are produced through the chemical modification of standard polysulfide liquid polymers with alkyl thioether dithiols of from 4 to 20 carbon atoms.

The thioether mercaptan terminated disulfide liquid polymer compositions used to produce the seals of the present invention are disclosed and claimed in co-pending application Ser. No. 768,402, filed Aug. 21, 1985, now U.S. Pat. No. 4,623,711, said co-pending application having the same assignee as the instant application. However, said copending application also discloses and claims many polymer compositions other than those used to provide the seals in the thermally insulating windows of the present invention. These other polymer compositions disclosed in the co-pending application do not possess the very unique property of very low permeability to argon gas which the thioether mercaptan terminated disulfide liquid polymer compositions disclosed herein have. This unique property allows the production of multi-pane thermally insulating constructions having an exceedingly long life (more than double the life of the prior art multi-pane thermally insulated constructions).

The most frequently used liquid polymers in sealants for argon filled multi-pane windows are "Thiokol" polysulfide liquid polymers such as those disclosed in U.S. Pat. No. 2,466,963 which issued in 1949. Typically, polysulfide polymers prepared in accordance with the teachings of this earlier patent have molecular weights on the order of about 2000 to about 8000 and are viscous liquids having viscosities ranging from about 1500 to about 150,000 centipoise. These polymers are formed of repeating units of diethyl formal disulfide with terminal mercaptan groups (hereinafter referred to as "diethyl formal mercaptan terminated polysulfides"). When such polymers are cured, they form hardened rubber-like solids exhibiting a number of desireable properties including resistance to water, ozone and sunlight. Additionally, these prior art polymers are relatively impermeable to inert gasses. As a result, prior art cured diethyl formal mercaptan terminated polysulfides have been widely used in sealants for multi-pane thermally insulating windows.

In multi-pne thermally insulating windows it is essential that the compartments containing the argon gas are effectively and reliably sealed against escape of the argon gas. It is also important that the sealants used in multi-pane thermally insulating windows are useful over a broad temperature range encountered in extremely cold climates and in extremely hot climates. It is also critical that such seals not be degraded by ozone or ultraviolet light. The prior art polysulfide sealants have been somewhat effective at preventing argon gas loss in multi-pane thermally insulating windows. But there certainly is a distinct need in the art to improve upon these prior art elastomeric compositions by decreasing the permeability to argon gas. If the escape of argon gas through difusion could be substantially decreased, this would mean that such multi-pane thermally insulating windows would have their useful life increased by many years.

Accordingly, it is the principal object of the present invention to provide a multi-pane thermally insulating construction having compartments filled with argon gas, said compartments being formed by two or more spaced panes, the inner edges of the panes being effectively sealed with a solid elastomer which substantially reduces the difusion loss of argon gas.

Another and further object of the present invention is to disclose and provide a method for making such multi-pane thermally insulating constructions which significantly reduce the loss of argon gas.

These and other objects of the present invention are achieved by the present invention by providing seals in multi-pane thermally insulating constructions, such as windows, in which the seals of such constructions are formed by thioether mercaptan terminated disulfide liquid polymer compositions which, when cured, exhibit significantly reduced argon gas permeability without sacrificing strength, resistance to environmental attack, or adhesion.

SUMMARY OF THE INVENTION

In accordance with the teachings of the present invention, thioether mercaptan terminated disulfide liquid polymer compositions are provided which, when cured to solid elastomers, exhibit a large decrease in argon gas permeability without sacrificing other desireable properties including high tensile strength, adhesion, and resistance to environmental factors including ozone and sunlight.

The present invention is based in part on the surprising discovery that when standard liquid diethyl formal mercaptan terminated polysulfides are modified through coreacting with small quantities (in amounts from about 1.5% to about 10% by weight) of alkyl thioether dithiols of from 4 to 20 carbon atoms, the resulting cured elastomeric compositions exhibit a significant decrease in argon gas permeability which is not observed with analogous formulations modified through coreactions with alkyl ether dithiols.

During the coreaction process, one of the reaction products formed is a chemically modified diethyl formal polysulfide having thioether linkages and mercaptan terminals ("thioether mercaptan terminated disulfide polymers"). Because this reaction cleaves one or more of the disulfide linkages of the starting liquid diethyl formal mercaptan terminated polysulfide, a second reaction product is formed which is identical to the starting liquid diethyl formal mercaptan terminated polysulfide except that it has a lower molecular weight. As a result, the overall molecular weight of the starting material decreases from between about 2000 and 8000 to between about 1000 and 4000. Those skilled in the art will appreciate that not all of the starting diethyl formal mercaptan terminated polysulfide is reacted in this process. Thus, some of the starting diethyl formal mercaptan terminated polysulfide is present in the modified disulfide liquid polymer composition produced in accordance with the teaching of the present invention.

The resulting chemically modified disulfide liquid polymer composition (hereinafter referred to as "thioether mercaptan terminated disulfide liquid polymer composition") will preferably have an average molecular weight of between about 1000 to about 4000 and a viscosity of between 1500 to 45,000 centipoise at 25° C. The thioether mercaptan terminated disulfide liquid polymer composition will contain at least 25 mole percent of thioether mercaptan terminated disulfide, based upon the total moles of thioether mercaptan terminated disulfide polymer and diethyl formal mercaptan terminated polysulfide present in the liquid polymer composition and may include up to 90 mole percent of thioether mercaptan terminated disulfide.

When the thioether mercaptan terminated disulfide liquid polymer compositions of the present invention are cured, they possess the desireable properties of the original diethyl formal mercaptan terminated polysulfide sealants in that the cured elastomers are resistant to oil, organic liquids, water, acid, alkalis, ozone and sunlight. More importantly, in addition to these properties, the argon gas permeability of the cured polymer compositions is reduced by approximately 50%, thereby doubling the insulating lifetime of the multi-pane thermally insulating construction units of the present invention.

In order to effectively and reliably seal the multi-pane thermally insulating windows against argon gas leakage, the liquid polymer compositions of the present invention are cured to a solid elastomer sealing material in a conventional manner. Accordingly, a multi-pane thermally insulating construction unit for effectively and reliably preventing loss of argon gas may be constructed in which one or more chambers provided by two or more spaced argon gas impermeable panes which are transparent to light are sealed with an exceedingly low argon gas permeable solid elastomeric sealant and filled with argon gas.

The production of the sealants of this invention involves the cleaving of the disulfide linkages of diethyl formal mercaptan terminated polysulfides with a specific quantity of an alkyl thioether dithiol organic cleaving compound to form mercaptan terminated disulfide polymer composition yielding sealants having an exceptionally low permeability to argon gas. Depending upon the amount of alkyl thioether dithiol utilized in the reaction relative to the amount of starting diethyl formal mercaptan terminated polysulfide, the resulting reaction product will comprise a liquid polymer composition, curable to a solid elastomer exhibiting the desired low permeability properties, which may contain up to 90 mole percent of the thioether mercaptan terminated disulfide polymers. The remaining portion of the mixture will comprise diethyl formal mercaptan terminated polysulfides. Accordingly, the chemically modified liquid polymer composition of the present invention will contain from about 25 mole percent to about 90 mole percent of thioether mercaptan terminated disulfide polymers and from about 10 mole percent to about 75 mole percent of diethyl formal mercaptan terminated polysulfides. There is basically a uniform distribution of polymer molecular weight in this composition because an equilibration occurs in the reaction mixture. Accordingly, the average molecular weight of the liquid polymer composition of the present invention will range from between about 1000 and about 4000.

The thioether mercaptan terminated disulfide polymer produced in accordance with the teachings of the present invention will have the formula $HS(RSS)_mR'SH$ wherein R is $-C_2H_4-O-CH_2-O-C_2H_4-$, R' is an alkyl thioether of from 4 to 20 carbon atoms, and the value of m is such that the molecular weight of the mercaptan terminated disulfide polymer is between about 1000 to 4000. Accordingly, generally speaking the value of m will be between about 5 to about 25 and preferably between about 5 to about 15, depending on the molecular weight of the alkyl thioether of R'.

The dimercaptan alkyl thioether cleaving compound will have the formula $R'(SH)_2$, where R' has the same significance as discussed above.

The diethyl formal mercaptan terminated polysulfide polymer included in the liquid composition of the present invention will have the formula $HS(RSS)_nRSH$ wherein R has the formula $-C_2H_4-O-CH_2-O-C_2H_4-$ and the value of n will be such that the molecular weight of the diethyl formal mercaptan terminated polysulfide polymer is between about 1000 and about 4000. Thus, the value of n will range from about 5 to about 25 and, preferably, from about 5 to about 15.

Those skilled in the art will appreciate that the starting diethyl formal mercaptan terminated polysulfide will have an identical structure to the cleaved diethyl formal mercaptan terminated polysulfide reaction product discussed above except that the starting polysulfide will have a molecular weight of from about 2000 to about 8000.

The preferred starting diethyl formal mercaptan terminated polysulfides are those available under the name "Thiokol" polysulfide liquid polymers. These compounds are commercially produced through the condensation of dischlorodiethyl formal with an alkali polysulfide in the presence of a polyfunctional branching agent such as 1,2,3-trichloropropane. The addition of the branching agent produces a branched polymer whereas a linear polymer would be produced if no branching agent is utilized.

The Thiokol polysulfides contemplated for use in the present invention are those in which R is diethyl formal and are commercially available in various grades known as LP-2, LP-12, LP-31, and LP-32 or mixtures of these compounds. All of these polymers are produced and sold by Morton Thiokol Chemical Corporation, Chicago, Illinois. Exclusive of LP-31, all of these polymers have a molecular weight of approximately 4000 and a viscosity of approximately 45,000 centipoise at 25° C. LP-31 has a molecular weight of approximately 8000 and a viscosity of approximately 150,000 at 25° C. Other molecular weight grades and types of liquid Thiokol polysulfides may be utilized to practice the present invention with results similar to those achieved with the preferred LP-2, LP-12, LP-31, and LP-32 formal mercaptan terminated polysulfide reactants, providing the repeating unit of any alternative liquid polysulfide is diethyl formal disulfide.

The cleavage reaction is carried out by mixing the diethyl formal mercaptan terminated polysulfide with the alkyl thioether dithiol, the molar ratio of the dithiol cleaving compound relative to diethyl formal mercaptan terminated polysulfide being approximately 0.3:1 to approximately 9:1 which will produce a mole percentage of thioether mercaptan terminated disulfide polymer ranging from about 25 mole percent to about 90 mole percent, respectively.

In conducting the reaction, it is preferred that the reaction mixture be maintained at or about ambient temperature, though temperature is not particularly critical to the reaction. Accordingly, the preferred temperature will range from between about 25° C. and about 100° C. Preferably, reaction will be carried out under an inert atmosphere such as nitrogen.

Though reaction will proceed without the presence of a catalyst, reaction times in the absence of catalysts may exceed 40 hours. As a result, the process is not economically viable without the addition of a catalyst. Organic amine catalysts are preferred as they considerably reduce the reaction time. Preferred organic amine catalysts are organic tertiary amines, specifically triethyl amine, diazabicyclo (2, 2, 2) octane (DABCO), diazabicycloundecene (DBU) and tetramethylguanidine (TMG). The preferred catalysts are DBU and TMG. Reaction times in the presence of the preferred organic tertiary amine catalysts range from between 1 hour to about 20 hours.

Other than providing a catalytically effective amount, the quantity of organic amine catalyst utilized is not particularly critical. Based upon the total weight of the starting reactants, it is preferred that the amount of catalyst will range from between 0.001 weight percent and 3.0 weight percent. However, it should be noted that quantities of catalyst greater than approximately 0.1 weight percent may alter the cure rate of the sealing composition. Accordingly, it is preferred to use less than 0.1 weight percent of the organic amine catalyst to avoid possible later problems.

Preferred alkyl thioether dithiols for obtaining the thioether mercaptan terminated disulfide liquid polymer composition of the present invention will have from 4 to 20 carbon atoms. The preferred alkyl thioether dithiol is dimercaptodiethyl sulfide having 4 carbon atoms such that R' in the organic dimercaptan cleaving compound having the general formula R'(SH)$_2$ has the formula —CH$_2$—CH$_2$—S—CH$_2$—CH$_2$—.

Curing of the thioether mercaptan terminated disulfide liquid polymer composition is accomplished in the same manner and with the same curing agents as is done with conventional mercaptan terminated polymers. These procedures and curing agents are well known in the art and include, for example, the curing procedures and curing agents of U.S. Pat. No. 3,629,206. The cure procedures include two component oxidation and epoxide addition. When cured in these conventional manners, the disulfide polymer compositions disclosed herein exhibit markedly decreased permeability to argon gas in addition to improved thermal stability and hence are applicable over a broad temperature range. Similarly, these polymer compositions exhibit enhanced tensile strength.

The sealants of the present invention also preferably contain standard additives such as fillers, pigments, plasticizers and adhesion promotors.

Fillers useful in the present invention are those generally known to the art skilled and include finely divided solids such as alumina, talc, calcium carbonate, etc. The amount of filler used will vary widely but, in general, will be from about 10 to about 400 parts by weight per 100 parts by weight of the thioether mercaptan terminated disulfide polymer and diethyl formal mercaptan terminated polysulfide polymer.

Pigments which may be added to the liquid polymer composition of the present invention to form the sealants used herein include those commonly used in the art such as titanium dioxide, carbon black, etc. The amount of such pigments will vary between about 1 part by weight and 100 parts by weight per 100 parts by weight of the thioether mercaptan terminated disulfide polymer and diethyl formal mercaptan terminated polysulfide polymer.

Plasticizers useful in the sealants of the present invention are known to the art skilled and include diesters, e.g. adipates, phthalates, etc. The amount of plasticizer may vary between about 10 parts by weight to 200 parts by weight per 100 parts by weight of the thioether mercaptan terminated polymer and diethyl formal mercaptan terminated polysulfide polymer.

Another additive preferably present in the sealants of the present invention is an adhesion promotor such as 3-mercaptopropyl trimethoxy silane which is present in relatively small amounts, for example 0.1 part by weight to 10 parts by weight per 100 parts by weight of the liquid polymers of the present invention.

DESCRIPTION OF THE PREFERRED EMBODIMENTS

Figure 1:
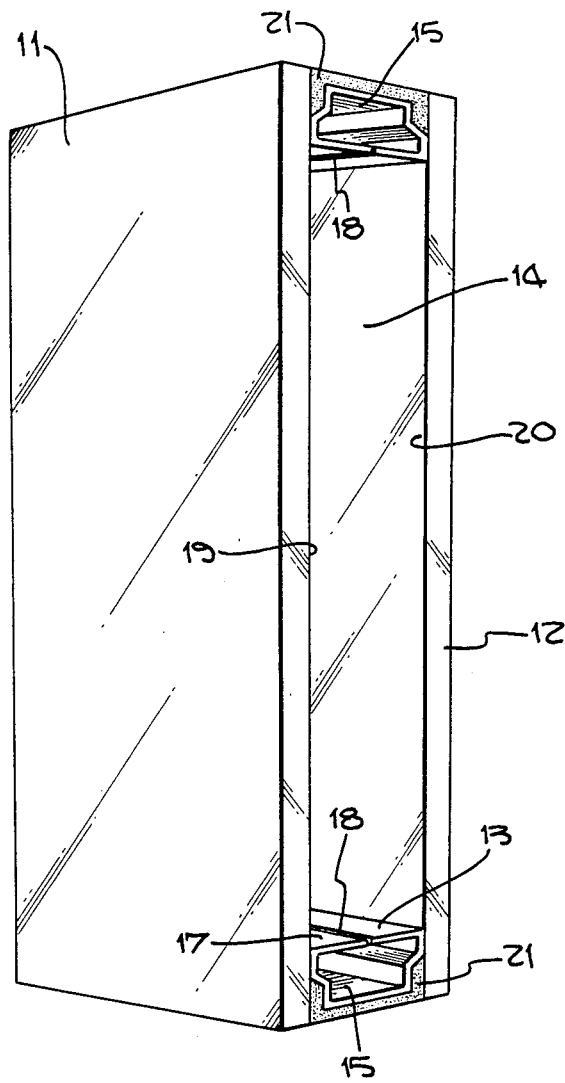
FIG. 1 is a perspective view of a multi-pane, thermally insulating construction employing the improved argon gas substantially impermeable seal of the present invention.
Figure 2:
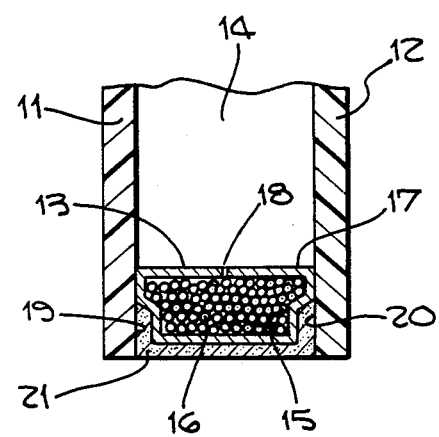
FIG. 2 is a detailed view of a portion of the multi-pane insulating construction in cross-section showing the argon gas substantially impermeable seal of the present invention.

Turning now to FIG. 1, there is shown a multi-pane thermally insulating construction composed of an outdoor window pane 11 which, in the preferred exemplary embodiment, is coated with an infrared reflective composition and an indoor window pane 12 which is clear. The two window panes, which may be made of glass, are spaced apart by spacing means 13 to form a chamber 14 having contained therein argon gas as a thermally insulating material. The spacing means 13 is preferably made of aluminum having a compartment 15 filled with a moisture absorbing material 16 which, in the preferred exemplary embodiment, is a Zeolite molecular sieve. Although, of course, the water absorbing material may be any type of desiccant. In the preferred exemplary embodiment, the desiccant is in the form of small balls.

In order to provide fluid communication between compartment 15 and chamber 14, the top wall 17 of spacing means 13 has a longitudinal slit 18 of a width less than the diameter of the desiccant balls 16.

The spacing means 13 are so positioned to provide a gap between inner edge surface margin 19 of window pane 11 and inner edge surface margin 20 of window pane 12, said gap being filled with a liquid polymer sealant composition of the present invention which is cured to a solid elastomer to form seal 21.

In the preferred exemplary embodiment, said spacing means 13 has longitudinal recesses in communication with said gap, said longitudinal recesses also being filled with the liquid polymer composition of the present invention which is cured to a solid elastomer to form a portion of the seal 21.

The curing of the liquid polymer composition to a solid elastomer to form the argon gas low permeable seal is accomplished by including in the liquid polymer composition curing agents known to those skilled in the art. In the preferred exemplary embodiment such curing agent is manganese dioxide.

In order to more fully exemplify the present invention, the following non-limiting examples are given.

EXAMPLE 1

A preferred low argon permeable modified disulfide polymer composition according to the present invention and designated as "formula A" was prepared in the following manner: 3000 grams of Thiokol LP-32 (molecular weight 4000) was mixed with 90 grams of dimercaptodiethyl sulfide and 0.03 grams of DBU. The mixture was heated at 70° C. for five hours and then cooled.

EXAMPLE 2

A conventional, unmodified Thiokol LP-32 liquid polymer was used as a control and designated as "formula B".

COMPARISON OF ARGON GAS PERMEABILITY

EXAMPLE 3

Essentially identical sealant formulations were prepared from polymer formulae A and B by mixing with 100 parts by weight of each formula the following material: 182 parts by weight of calcium carbonate, 18.5 parts by weight of a phthalate ester (Santicizer 278, Monsanto Chemical Company), 3.3 parts by weight of titanium dioxide, 2.6 parts by weight of toluene and 0.5 parts by weight of 3—mercaptopropyl trimethoxy silane. To both of these formulations, prepared as indicated above, were mixed, with 100 parts of the base formulation, 10 parts by weight of a curing agent composed of 39 parts by weight of Santicizer 278, 59 parts by weight of manganese dioxide and two parts by weight of lead dioxide.

MEASUREMENT OF PERMEABILITY

Insulating glass units measuring 350 by 508 mm. were prepared using 12 mm. spacers of aluminum with 4 mm. thick glass panes. These units were sealed with sealant formulation A and sealant formulation B. The interior air space of these units was filled with argon gas by drilling two holes on opposite edges and filling from the bottom to fully flush out the air and resealing the holes. The sealed argon filled units were aged for four months at 25° C. until the sealants were fully cured and the rate of argon gas permeability had become constant. The permeating gas was continuously collected in a liquid nitrogen vessel and analyzed for argon content with a gs chromatograph. Sealant formulation A, which is based on the liquid polymer composition of the present invention, gave a diffusion loss of argon of 0.25 micro liters per hour at 25° C. In contrast, sealant formulation B made with unmodified Thiokol polymer LP-32 gave a diffusion loss of argon of 0.52 micro liters per hour at 25° C. Such a great improvement in diffusion loss increases the life of the insulating qualities of windows by years and is therefore of great importance.

I claim:

1. In a method for substantially preventing the escape of argon gas from a chamber defined by at least two argon gas impermeable transparent panes in spaced relation and argon gas impermeable spacing means extending between inner edge surface portions of said panes, including the steps of:

applying an argon gas sealing effective amount of a liquid polymer composition between each of said inner edge surface portions and said spacing means to form a seal, said liquid polymer composition consisting essentially of (a) from about 90 mole percent to about 25 mole percent of thioether mercaptan terminated disulfide polymer of the formula HS $(RSS)_m$R'SH;

(b) from about 10 mole percent to about 75 mole percent of diethyl formal mercaptan terminated polysulfide polymer of the formula HS$(RSS)_n$RSH; wherein in the formulae R is $-C_2H_4-O-CH_2H_4-$; R' is alkyl thioether of from 4 to 20 carbon atoms and the value of m and n is such that the diethyl formal mercaptan terminated polysulfide and the thioether mercaptan terminated polysulfide and the thioether mercaptan terminated disulfide polymer have an average molecular weight of between about 1000 and about 4000; and (c) a curing effective amount of a curing agent; curing said liquid polymer composition to a solid elastomer which is substantially impervious to argon gas; drilling through said solid elastomer; and filling said chamber with argon gas and flushing out the air from said chamber.

2. In a method according to claim 1 wherein said panes are glass.

3. In a method according to claim 1 wherein R' is alkyl thioether having 4 carbon atoms.

4. In a method according to claim 3 wherein said liquid polymer composition includes at least one additive selected fromm the group consisting of a filler, a pigment, a plasticizer and an adhesion promotor.

5. In a method according to claim 1 wherein said curing agent is manganese dioxide.

6. In a method for substantially preventing the escape of argon gas from a chamber defined by at least two argon gas impermeable and transparent panes in spaced relation and argon gas impermeable spacing means adjacent said edge and extending between inner edge surface margins of said panes, including the steps of: positioning said spacing means to provide a gap between said edges; providing longitudinal recesses in said spacing means in communication with said gap, filling said longitudinal recesses with an argon gas sealing effective amount of a liquid polymer composition consisting essentially of
  (a) from about 90 mole percent to about 25 mole percent of thioether mercaptan terminated disulfide polymer of the formula $HS(RSS)_m RSH$;
  (b) from about 10 mole percent to about 75 mole percent of diethyl formal mercaptan terminated polysulfide polymer of the formula $HS(RSS)_n RSH$; wherein in the formulae R is $-C_2H_4-O-CH_2H_4-$; R' is alkyl thioether of from 4 to 20 carbon atoms and the value of m and n is such that the diethyl formal mercaptan terminated polysulfide and the thioether mercaptan terminated disulfide polymer have an average molecular weight of between about 1000 and about 4000; and
  (c) a curing effective amount of a curing agent; curing said liquid polymer composition to a solid elastomer which is substantially impervious to argon gas; drilling through said solid elastomer; and filling said chamber with argon gas and flushing out the air from said chamber.

7. In a method according to claim 6 comprising the additional step of filling said gap with said liquid polymer composition.

8. In a method according to claim 7 wherein said panes are glass.

9. In a method according to claim 6 wherein R' is alkyl thioether having 4 carbon atoms.

10. In a method according to claim 9 wherein said liquid polymer composition includes at least one additive selected from the group consisting of a filler, a pigment, a plasticizer and an adhesion promotor.

* * * * *